US012165821B2

(12) United States Patent
Tian et al.

(10) Patent No.: US 12,165,821 B2
(45) Date of Patent: Dec. 10, 2024

(54) CONTACT APPARATUS AND ELECTROMAGNETIC SWITCH

(71) Applicant: Huawei Digital Power Technologies Co., Ltd., Shenzhen (CN)

(72) Inventors: Xiaokang Tian, Shanghai (CN); Taixian Chen, Dongguan (CN); Fugao Zhao, Dongguan (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 190 days.

(21) Appl. No.: 17/896,527

(22) Filed: Aug. 26, 2022

(65) Prior Publication Data

US 2022/0406544 A1 Dec. 22, 2022

Related U.S. Application Data

(63) Continuation of application No. PCT/CN2021/077456, filed on Feb. 23, 2021.

(30) Foreign Application Priority Data

Feb. 26, 2020 (CN) ........................ 202020218336.6

(51) Int. Cl.
*H01H 50/20* (2006.01)
*H01H 50/36* (2006.01)
(Continued)

(52) U.S. Cl.
CPC ............ *H01H 50/20* (2013.01); *H01H 50/36* (2013.01); *H01H 50/44* (2013.01); *H01H 50/58* (2013.01)

(58) Field of Classification Search
CPC ........ H01H 50/20; H01H 50/36; H01H 50/44; H01H 50/58; H01H 2050/028;
(Continued)

(56) References Cited

U.S. PATENT DOCUMENTS 7,403,086 B2 * 7/2008 Wu ........................ H01H 83/04 361/49
7,737,811 B2 * 6/2010 Trottmann ............. H01H 50/36 335/202
(Continued)

FOREIGN PATENT DOCUMENTS

CN 2764054 Y 3/2006
CN 101976635 A 2/2011
(Continued)

*Primary Examiner* — Shawki S Ismail
*Assistant Examiner* — Lisa N Homza
(74) *Attorney, Agent, or Firm* — Conley Rose, P.C.

(57) ABSTRACT

A contact apparatus includes a fixed contact and a moving contact component. The moving contact component includes a push rod, a contact bracket, an insulated sleeve, a moving contact, and a contact spring. The insulated sleeve is fixedly sleeved on a first end of the push rod, a second end of the push rod is configured to connect a drive apparatus, the contact bracket is fixedly sleeved on the insulated sleeve, the moving contact and the contact spring are both flexibly sleeved on the insulated sleeve, the contact spring elastically abuts between the moving contact and the contact bracket, the moving contact and the fixed contact are disposed relative to each other in an extension direction of the push rod, and the moving contact can be driven by the push rod to be connected to the fixed contact.

20 Claims, 5 Drawing Sheets

(51) Int. Cl.
*H01H 50/44* (2006.01)
*H01H 50/58* (2006.01)

(58) Field of Classification Search
CPC .... H01H 50/546; H01H 50/60; H01H 50/305; H01H 50/16
USPC .............................................................. 335/2
See application file for complete search history.

(56) References Cited

U.S. PATENT DOCUMENTS

| | | | | |
|---|---|---|---|---|
| 8,138,440 | B2 * | 3/2012 | Onufriyenko | H01H 73/045 335/193 |
| 8,159,321 | B2 * | 4/2012 | Bollinger | H01H 50/546 335/106 |
| 8,786,388 | B2 * | 7/2014 | Ramezanian | F02N 11/087 335/133 |
| 8,947,183 | B2 * | 2/2015 | Yano | H01H 1/36 335/202 |
| 9,203,230 | B2 * | 12/2015 | Ziegler | H01H 50/18 |
| 9,275,814 | B2 * | 3/2016 | Lee | H01H 50/545 |
| 10,388,477 | B2 * | 8/2019 | Sullivan | H01H 50/18 |
| 10,566,160 | B2 * | 2/2020 | McTigue | H01H 71/40 |
| 10,755,882 | B2 * | 8/2020 | Huang | H01H 50/546 |
| 2004/0070474 | A1 * | 4/2004 | Wu | H01H 83/04 361/42 |
| 2013/0057369 | A1 | 3/2013 | Yano et al. | |
| 2018/0350540 | A1 * | 12/2018 | Sullivan | H01H 50/18 |
| 2019/0006140 | A1 | 1/2019 | Shi et al. | |
| 2019/0198277 | A1 * | 6/2019 | McTigue | H01H 71/08 |

FOREIGN PATENT DOCUMENTS

| | | | |
|---|---|---|---|
| CN | 101677044 | B | 12/2011 |
| CN | 102804317 | B | 2/2015 |
| CN | 103426689 | B | 4/2015 |
| CN | 207052537 | U | 2/2018 |
| CN | 108321035 | A | 7/2018 |
| CN | 207743137 | U | 8/2018 |
| CN | 105551897 | B | 11/2018 |
| CN | 106128857 | B | 1/2019 |
| CN | 212161708 | U | 12/2020 |
| EP | 3432336 | A1 | 1/2019 |
| JP | H07130269 | A | 5/1995 |
| KR | 20160121961 | A | 10/2016 |
| WO | 2020031068 | A1 | 2/2020 |

* cited by examiner

CONTACT APPARATUS AND ELECTROMAGNETIC SWITCH

CROSS-REFERENCE TO RELATED APPLICATIONS

This is a continuation of International Patent Application No. PCT/CN2021/077456 filed on Feb. 23, 2021, which claims priority to Chinese Patent Application No. 202020218336.6 filed on Feb. 26, 2020. The disclosures of the aforementioned applications are hereby incorporated by reference in their entireties.

TECHNICAL FIELD

This disclosure relates to the field of technologies of an electric control component, and in particular, to a contact apparatus and an electromagnetic switch.

BACKGROUND

An electromagnetic switch is an electrical appliance that can frequently switch on/off, carry, and turn on/off a normal current and a specified overload current. A working principle of the electromagnetic switch is that a current flows through coils to generate a magnetic field to switch on/off a contact, thereby controlling a load. The electromagnetic switch usually includes a contactor and a relay.

A voltage of a battery pack in most electric vehicles reaches 450 volts of direct current (VDC). Voltages of some battery packs reach 800 VDC to 1000 VDC. A surge voltage, electrical spacing, and a creepage distance corresponding to a high/low-voltage system and a component of an entire vehicle correspondingly increase. Isolation is not implemented between a high voltage and a low voltage of an electromagnetic switch of a conventional epoxy package and some ceramic packages. After a moving contact is connected to a fixed contact, a moving iron core, a fixed iron core, and a magnet yoke of an electromagnetic system are all charged. As a result, electrical spacing and a creepage distance between a high-voltage contact system and a low-voltage coil system do not meet a basic insulation requirement. There is a high safety risk. Therefore, a relatively large safety accident is likely to occur.

SUMMARY

Embodiments of this disclosure provide a contact apparatus and an electromagnetic switch, to reduce a safety risk and improve safety reliability.

According to a first aspect, this disclosure provides a contact apparatus applied to an electromagnetic switch. The contact apparatus includes a fixed contact and a moving contact component. The moving contact component includes a push rod, a contact bracket, an insulated sleeve, a moving contact, and a contact spring. The insulated sleeve is fixedly sleeved on a first end of the push rod. A second end of the push rod is configured to connect a drive apparatus. The contact bracket is fixedly sleeved on the insulated sleeve. The moving contact and the contact spring are both flexibly sleeved on the insulated sleeve. The contact spring elastically abuts between the moving contact and the contact bracket. The moving contact and the fixed contact are disposed relative to each other in an extension direction of the push rod. The moving contact can be driven by the push rod to be connected to the fixed contact.

Because the insulated sleeve is sleeved on the first end of the push rod, and the moving contact is sleeved on the insulated sleeve, the insulated sleeve can insulate the push rod from the moving contact. When driven by the drive apparatus, the push rod connects the moving contact to the fixed contact. The insulated sleeve can fully isolate the push rod from a high-voltage contact loop in the electromagnetic switch. In this way, when the electromagnetic switch switches a large-current and direct-current high-voltage load, a low-voltage coil part of the electromagnetic switch is not affected and damaged by a large current and a high voltage, thereby avoiding a safety problem caused by a breakdown between a high voltage and a low voltage, that is, improving safety reliability of the electromagnetic switch.

According to the first aspect, in a first possible implementation of the first aspect, the contact bracket includes a first support kit and a second support kit that are disposed relative to each other. A first connection hole is disposed on the first support kit. A second connection hole is disposed on the second support kit. The first end of the push rod fixedly passes through the first connection hole and the second connection hole. The moving contact is located between the first support kit and the contact spring. The contact spring is located between the moving contact and the second support kit.

The insulated sleeve extends from the first connection hole of the first support kit to the second connection hole of the second support kit along the push rod. The moving contact can move along an outer wall of the insulated sleeve, to improve an overrun of the moving contact.

With reference to the first aspect or the first possible implementation of the first aspect, in a second possible implementation of the first aspect, the first connection hole is a through hole passing through the first support kit. The insulated sleeve includes a guide part and an abutting flange disposed on an end of the guide part. The guide part fixedly passes through the first connection hole and the second connection hole. The abutting flange abuts against a side of the first support kit away from the second support kit, to conveniently mount the insulated sleeve on the contact bracket and prevent the insulated sleeve from being separated from the contact bracket.

With reference to any one of the first aspect or the first and the second possible implementations of the first aspect, in a third possible implementation of the first aspect, the first connection hole includes a first installation section and a second installation section. The first installation section is disposed on an end of the first connection hole away from the second support kit. An aperture of the first installation section is greater than an aperture of the second installation section. The abutting flange is fixedly accommodated in the first installation section and abuts against a bottom wall of the first installation section, to conveniently mount the insulated sleeve on the contact bracket.

With reference to any one of the first aspect or the first to the third possible implementations of the first aspect, in a fourth possible implementation of the first aspect, the contact apparatus further includes a circlip. A slot is disposed on the first end of the push rod. The slot is located on the side of the first support kit away from the second support kit. The circlip is clamped into the slot and abuts against the abutting flange, to prevent the insulated sleeve from moving in an axial direction of the push rod.

With reference to any one of the first aspect or the first to the fourth possible implementations of the first aspect, in a fifth possible implementation of the first aspect, the contact apparatus further includes a gasket. The gasket is located between an abutting part and the circlip, to prevent looseness between the insulated sleeve and the circlip and also prevent damage of the circlip to the insulated sleeve, thereby prolonging a service life of the insulated sleeve.

With reference to any one of the first aspect or the first to the fifth possible implementations of the first aspect, in a sixth possible implementation of the first aspect, the second support kit includes a board body and a convex part disposed on the board body facing the first support kit. The contact spring is sleeved outside the convex part. The contact spring elastically abuts between the moving contact and the board body.

With reference to any one of the first aspect or the first to the sixth possible implementations of the first aspect, in a seventh possible implementation of the first aspect, the contact apparatus further includes a base. The fixed contact is fixed to the base. At least a part of the fixed contact is located in the base. The first end of the push rod extends into the base. The contact bracket, the insulated sleeve, the contact spring, and the moving contact bracket are all located in the base. The second end of the push rod is exposed outside the base. The base can protect the fixed contact and the moving contact, and prevent external interference to movement of the moving contact component.

With reference to any one of the first aspect or the first to the seventh possible implementations of the first aspect, in an eighth possible implementation of the first aspect, the push rod includes a rod body and a convex limiting part disposed in a circumferential direction of the rod body. The insulated sleeve is sleeved on a first end of the rod body. The limiting part is exposed outside the base to abut against a first abutting part in the first insertion through hole of the fixed iron core, to prevent the push rod from deviating from an original position in a process of returning to the original position.

According to a second aspect, this disclosure further provides an electromagnetic switch, including the foregoing contact apparatus and a drive apparatus. A base is fixedly connected to the drive apparatus. The drive apparatus includes a magnet yoke, a coil skeleton, coils, a fixed iron core, a moving iron core, and a reset spring. The coil skeleton is fixedly accommodated in the magnet yoke. The coils are sleeved outside the coil skeleton. The fixed iron core and the moving iron core are accommodated in the coil skeleton along an axial direction of the coil skeleton. The fixed iron core is fixed on an end of the coil skeleton close to the contact bracket. A second end of the push rod is fixedly connected to the moving iron core. The push rod flexibly passes through the fixed iron core and the magnet yoke. The reset spring is sleeved on the push rod. The reset spring abuts between the fixed iron core and the moving iron core. The fixed iron core can be magnetized after the coils are charged to generate suction force, so that the moving iron core moves towards the fixed iron core under a function of the suction force.

When the moving contact is connected to the fixed contact, the coils, the magnet yoke, the fixed iron core, the moving iron core, and the push rod are all charged. The coils are provided with a low-voltage (for example, 12 volts (V)) current. The magnet yoke, the fixed iron core, the moving iron core, and the push rod form a high-voltage push rod loop. The moving contact and the fixed contact form a high-voltage contact loop. Because an insulated sleeve is fixedly sleeved on a first end of the push rod, the moving contact is flexibly sleeved on the insulated sleeve, so that electrical insulation is well maintained between the moving contact and the push rod, and the high-voltage contact loop is fully isolated from the low-voltage coils. In this way, when the electromagnetic switch switches a large-current and direct-current high-voltage load, the low-voltage coils of the electromagnetic switch is not affected and damaged by a large current and a high voltage, thereby avoiding a safety problem caused by a breakdown between a high voltage and a low voltage, that is, improving safety reliability of the electromagnetic switch.

With reference to the second aspect, in a first possible implementation of the second aspect, a first insertion through hole is disposed on the fixed iron core. A first convex abutting part is disposed on an inner wall of the first insertion through hole. A second insertion through hole is disposed on the moving iron core. The first insertion through hole and the second insertion through hole are coaxially disposed. A second convex abutting part is disposed on an inner wall of the second insertion through hole. The reset spring abuts between the first abutting part and the second abutting part. The push rod passes through the first insertion through hole and the second insertion through hole. The first insertion through hole and the second insertion through hole can limit and guide movement of the push rod.

With reference to the second aspect or the first possible implementation of the second aspect, in a second possible implementation of the second aspect, the magnet yoke includes an enclosure and a cover. The enclosure has an opening. The cover fixedly covers the opening of the enclosure. A mounting hole is disposed on an end of the enclosure away from the cover. The magnet yoke further includes a convex positioning part on an inner wall of the enclosure. The positioning part is disposed around the mounting hole. The coil skeleton is of a hollow structure. An abutting step is disposed on an inner wall of the coil skeleton. The coil skeleton is sleeved on the positioning part. The positioning part abuts against the abutting step, to prevent the coil skeleton from moving in the magnet yoke.

With reference to any one of the second aspect or the first and the second possible implementations of the second aspect, in the second possible implementation of the second aspect, the drive apparatus further includes a sealing sleeve. The sealing sleeve is accommodated in the coil skeleton and covers the fixed iron core and the moving iron core in a sealing manner, to seal the coil skeleton.

DESCRIPTION OF EMBODIMENTS

An electromagnetic switch in the embodiments of this disclosure is an electrical appliance that can frequently switch on/off, carry, and turn on/off a normal current and a specified overload current. A working principle of the electromagnetic switch is that a current flows through coils to generate a magnetic field to switch on a contact, thereby controlling a load. The electromagnetic switch usually includes a contactor and an electromagnetic relay.

A direct-current contactor is used as an example for description in the embodiments of this disclosure.

Figure 1:
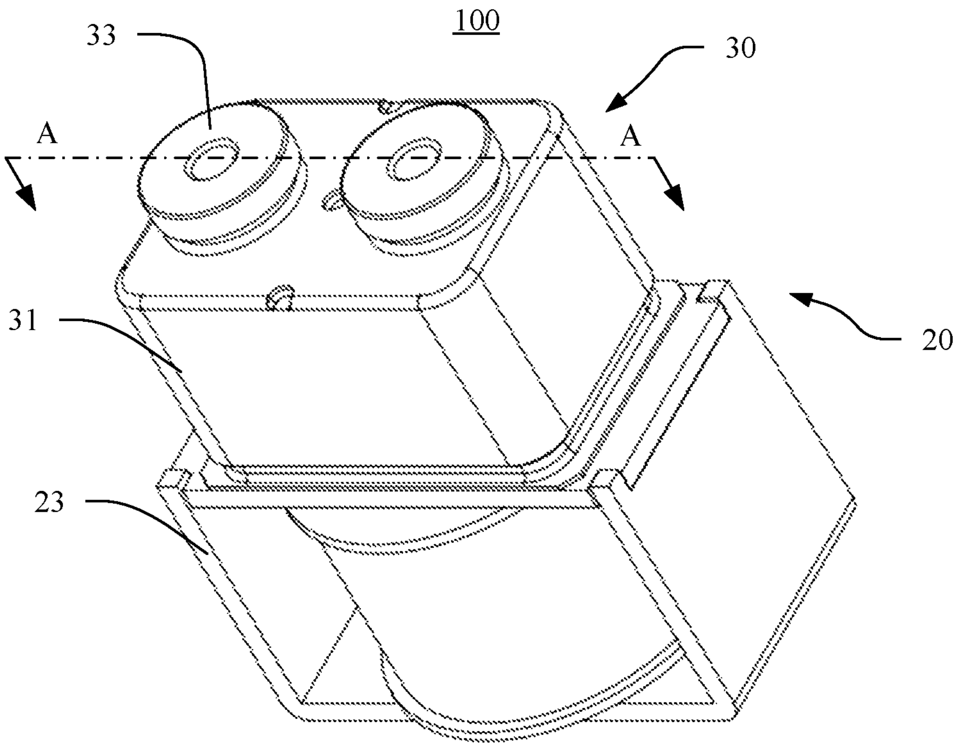
FIG. 1 is a schematic diagram of stereoscopic assembly of an electromagnetic switch according to an embodiment of this disclosure.

With reference to FIG. 1, an electromagnetic switch 100 provided in an implementation of this disclosure includes a drive apparatus 20 and a contact apparatus 30 disposed on the drive apparatus 20. The electromagnetic switch 100 shown in FIG. 1 generally further includes a housing. For example, the contact apparatus 30 and the drive apparatus 20 are accommodated in the hollow square housing. The schematic diagram shows the electromagnetic switch 100 without the housing in the embodiments of this disclosure. The drive apparatus 20 uses an electromagnetic field generated by coils to drive and control on/off of the contact apparatus 30. The electromagnetic switch 100 in this implementation is a normally open contactor whose initial status is that a contact is disconnected. The electromagnetic switch 100 in another implementation may alternatively be a normally closed contactor whose initial status is that a contact is connected.

Figure 2A:
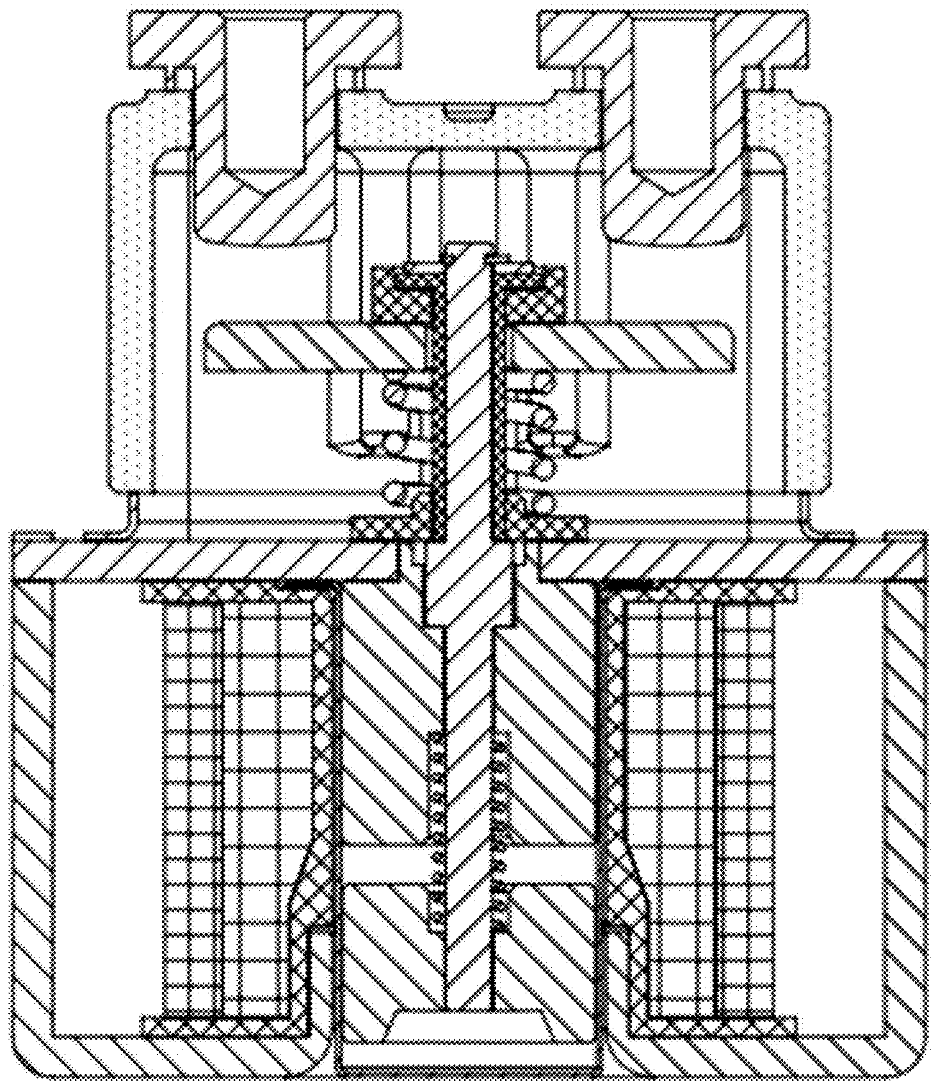
FIGS. 2A-2C are cutaway drawings of the electromagnetic switch shown in FIG. 1 along an A-A line.
Figure 2B:
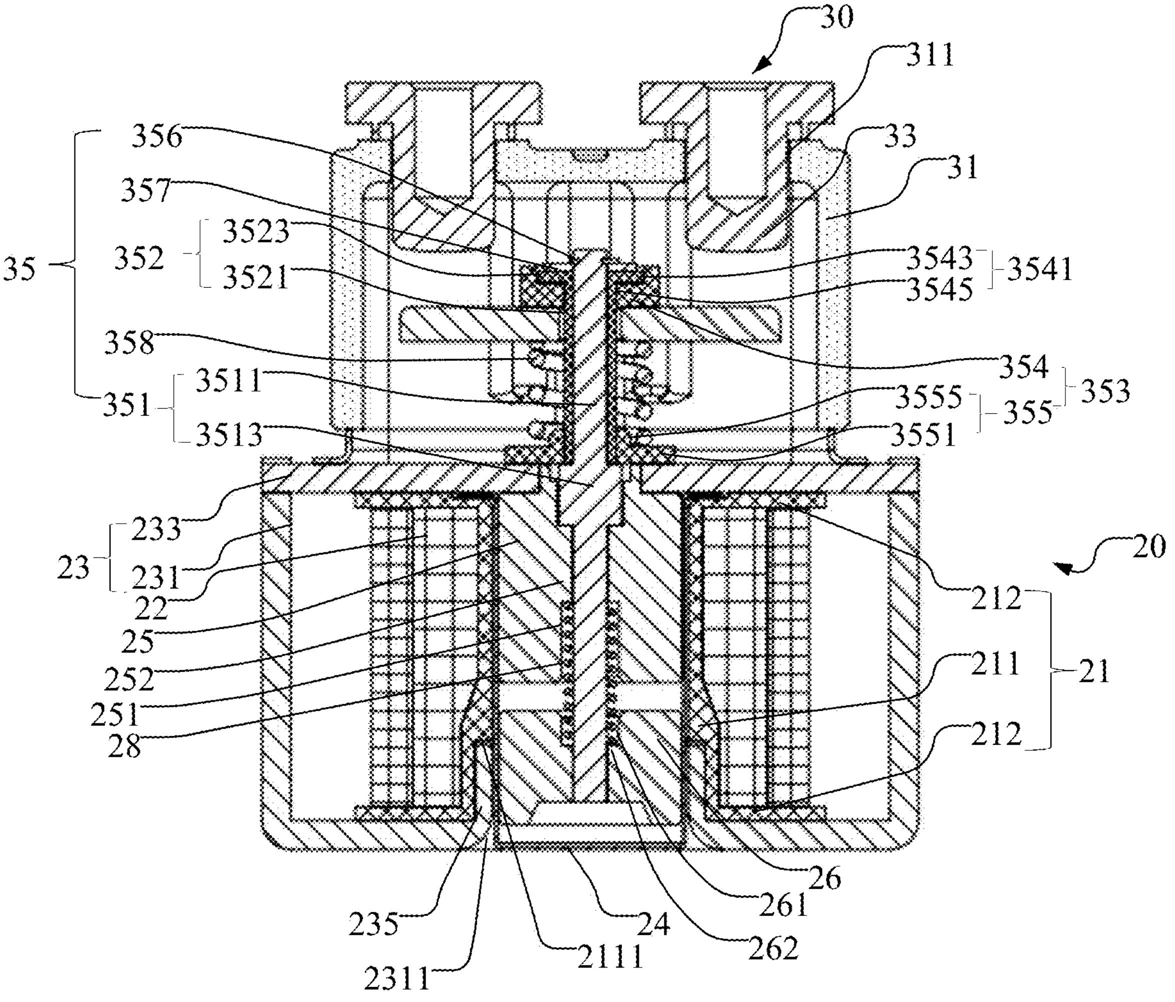

With reference to FIGS. 2A and 2B, the drive apparatus 20 includes a coil skeleton 21, coils 22, a magnet yoke 23, a fixed iron core 25, a moving iron core 26, a sealing sleeve 24, and a reset spring 28.

Further, the coil skeleton 21 includes a hollow cylindrical body part 211. Convex flange parts 212 are formed on two ends in an axial direction of the body part 211 to a radial direction. The axial direction is a direction of a rotation central axis of an object (for example, a cylinder), that is, a direction parallel to the central axis. The radial direction is perpendicular to the axial direction, that is, a direction of a radius or a diameter of an end-face circle of the cylinder.

The coils 22 are wound on the body part 211 of the coil skeleton 21 and are located between the two convex flange parts 212 on the two ends of the body part 211. It may be understood that the two ends of the coils 22 are further connected to coil terminals (not shown in the figure). For example, the coil terminals may be made of a conductive material such as copper. In this way, the coils 22 may be charged by using the coil terminals to drive the contact apparatus 30.

The magnet yoke 23 is made of a magnetic material and covers the coil skeleton 21. In an implementation of this disclosure, the magnet yoke 23 is approximately in a rectangle shape. The magnet yoke 23 includes an enclosure 231 and a cover 233. The enclosure 231 has an opening. The cover 233 fixedly covers the opening of the enclosure 231. A mounting hole 2311 is disposed on an end of the enclosure 231 away from the cover 233. The magnet yoke 23 further includes a convex positioning part 235 on an inner wall of the enclosure 231. The positioning part 235 is disposed around the mounting hole 2311. The body part 211 is of a hollow structure. An abutting step 2111 is disposed on an inner wall of the body part 211. The body part 211 is sleeved on the positioning part 235. The positioning part 235 abuts against the abutting step 2111, to prevent the coil skeleton 21 from moving in the magnet yoke 23. One convex flange part 212 abuts against a face of the cover 233 facing the enclosure 231. The other convex flange part 212 abuts against the inner wall of the enclosure 231. It may be understood that the enclosure 231 and the positioning part 235 may be integrally formed, or may be separately manufactured. A structure of the magnet yoke 23 is not limited. For example, the mounting hole 2311 and the positioning part 235 may be removed from the magnet yoke 23. The coil skeleton 21 is directly fastened to the magnet yoke 23. A structure of the coil skeleton 21 is not limited. Ends of the body part 211 abut against the cover 233 and the enclosure 231.

The sealing sleeve 24 fixedly passes through the body part 211, to form enclosed space in the body part 211. In this implementation, the sealing sleeve 24 is made of a non-ferromagnetic material.

The fixed iron core 25 and the moving iron core 26 are disposed in the sealing sleeve 24 in the axial direction of the body part 211 of the coil skeleton 21. The fixed iron core 25 is fixedly disposed in the sealing sleeve 24 and is close to an upper cover 233. There is a gap between the fixed iron core 25 and the moving iron core 26, to reserve specific moving space for the moving iron core 26. After the coils 22 are charged, the fixed iron core 25 is magnetized to generate suction force, and the moving iron core 26 moves towards the fixed iron core 25 under a function of the suction force. In this implementation, the fixed iron core 25 and the moving iron core 26 are generally cylindrical. It may be understood that shapes of the fixed iron core 25 and the moving iron core 26 are not limited.

In this embodiment of this disclosure, outer diameters of the fixed iron core 25 and the moving iron core 26 are approximately the same as an inner diameter of the sealing sleeve 24. The fixed iron core 25 is disposed on an opening side of the sealing sleeve 24. The moving iron core 26 moves in the sealing sleeve 24. It may be understood that the sealing sleeve 24 may be alternatively removed. For example, the coil skeleton 21 is directly set to a structure that is sealed on one end. The fixed iron core 25 and the moving iron core 26 are accommodated in the coil skeleton 21.

The reset spring 28 is sandwiched between the fixed iron core 25 and the moving iron core 26. The reset spring 28 is configured to impose, on the moving iron core 26, driving force whose direction is opposite to a direction of the suction force generated by the fixed iron core 25, so that the moving iron core 26 is driven to be returned to an original position when the coils 22 are discharged, that is, the moving iron core 26 of the drive apparatus 20 is driven to move to a bottom end of the sealing sleeve 24 away from the cover 233.

It should be noted that in this embodiment of this disclosure, a first insertion through hole 251 is disposed on the fixed iron core 25, and a first convex abutting part 252 is disposed on an inner wall of the first insertion through hole 251. A second insertion through hole 261 is disposed on the moving iron core 26. The first insertion through hole 251 and the second insertion through hole 261 are coaxially disposed. A second convex abutting part 262 is disposed on an inner wall of the second insertion through hole 261. Two ends of the reset spring 28 respectively abut between the first abutting part 252 and the second abutting part 262.

Figure 3:
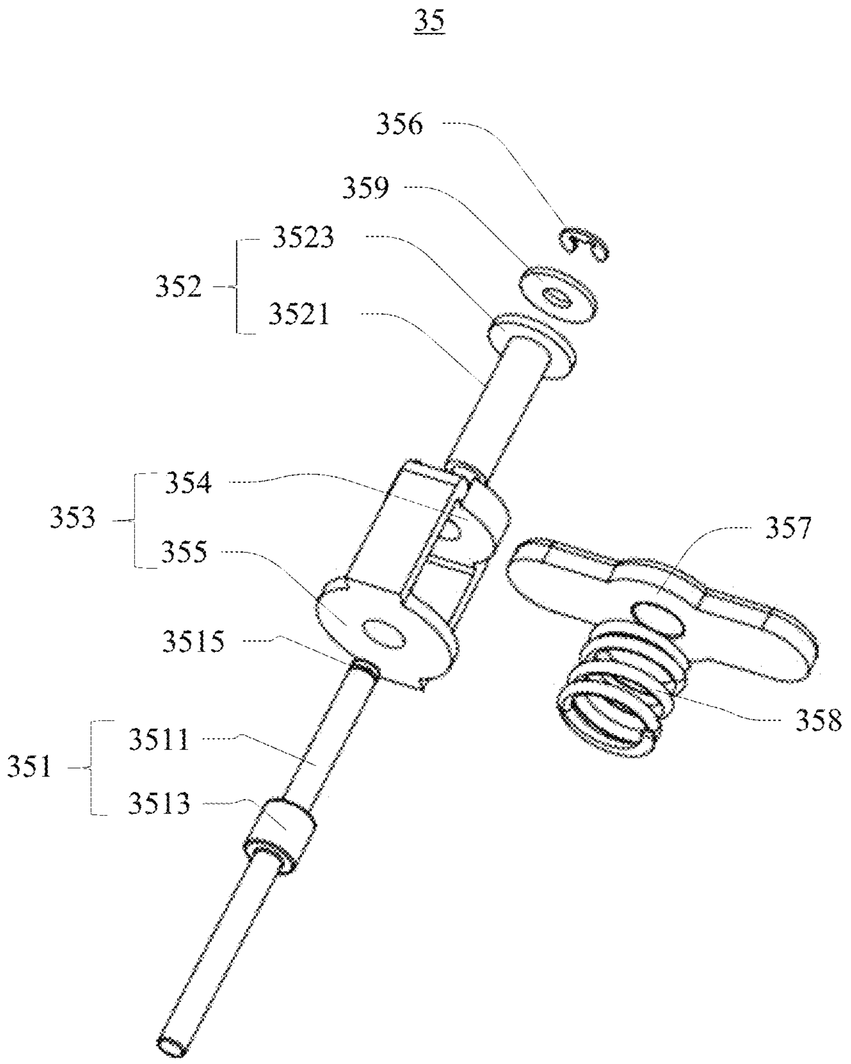
FIG. 3 is a schematic stereoscopic exploded view of a contact apparatus of an electromagnetic switch.

With reference to FIG. 3, the contact apparatus 30 includes a base 31, a fixed contact 33, and a moving contact component 35.

The base 31 is fastened to the cover 233 of the magnet yoke 23. A through hole 311 is disposed on the top of the base 31 away from the drive apparatus 20. The fixed contact 33 passes through the corresponding through hole 311 and fixedly extends into the base 31. In this embodiment of this disclosure, the base 31 is made of a heat-resistant material (for example, ceramic). The fixed contact 33 is made of a conductive material such as a copper material.

The moving contact component 35 includes a push rod 351, an insulated sleeve 352, a contact bracket 353, a moving contact 357, and a contact spring 358.

A first end of the push rod 351 is located in the base 31. A second end of the push rod 351 extends into and passes through the fixed iron core 25, and is fixedly connected to the moving iron core 26, to implement connection to the drive apparatus 20. The insulated sleeve 352 is fixedly sleeved on the first end of the push rod 351 and is accommodated in the base 31. The contact bracket 353 is fixedly sleeved outside the insulated sleeve 352. The moving contact 357 and the contact spring 358 are both flexibly sleeved on the insulated sleeve 352 and are located in the contact bracket 353. The contact spring 358 elastically abuts between the moving contact 357 and the contact bracket 353. The moving contact 357 and the fixed contact 33 are disposed relative to each other in an extension direction of the push rod 351. The moving contact 357 can be driven by the push rod 351 to be connected to the fixed contact 33.

Figure 2C:
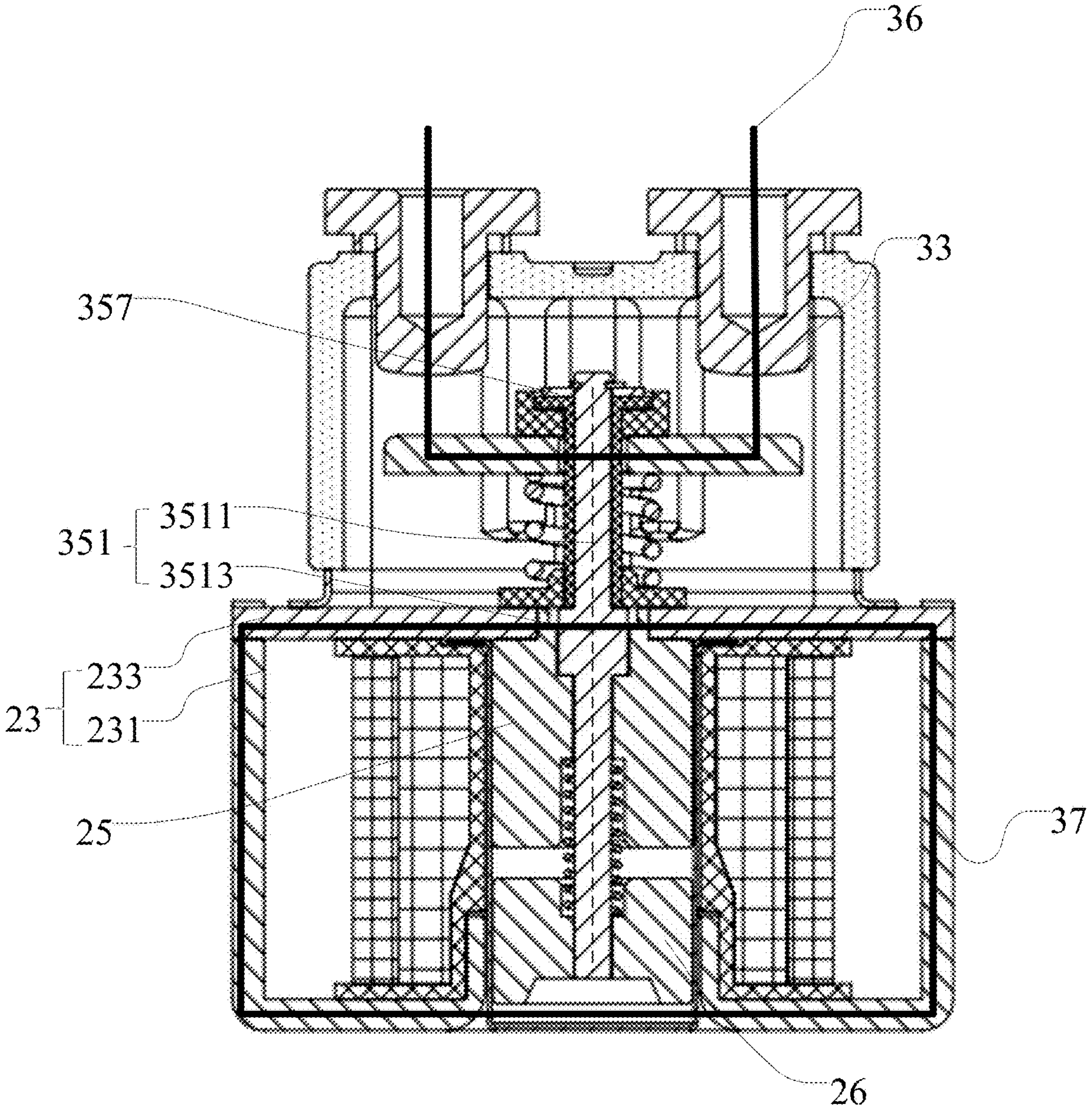

When the moving contact 357 is connected to the fixed contact 33, the coils 22, the magnet yoke 23, the fixed iron core 25, the moving iron core 26, and the push rod 351 are all charged. The coils 22 are provided with a low-voltage (for example, 12 V) current. The magnet yoke 23, the fixed iron core 25, the moving iron core 26, and the push rod 351 form a high-voltage push rod part (shown by line 37 in FIG. 2C). The moving contact 357 and the fixed contact 33 form a high-voltage contact loop (shown by line 36 in FIG. 2C). Because the insulated sleeve 352 is fixedly sleeved on the first end of the push rod 351, the moving contact 357 is flexibly sleeved on the insulated sleeve 352, so that electrical insulation is well maintained between the moving contact 357 and the push rod 351, and the high-voltage contact loop is fully isolated from the low-voltage coils 22. In this way, when the electromagnetic switch 100 switches a large-current and direct-current high-voltage load, the low-voltage coils 22 of the electromagnetic switch 100 is not affected and damaged by a large current and a high voltage, thereby avoiding a safety problem caused by a breakdown between a high voltage and a low voltage, that is, improving safety reliability of the electromagnetic switch 100.

Furthermore, the push rod 351 includes a rod body 3511 and a convex limiting part 3513 disposed in a circumferential direction of the rod body 3511. The second end of the rod body 3511 passes through the first insertion through hole 251 of the fixed iron core 25 and fixedly passes through the second insertion through hole 261 of the moving iron core 26. In this way, the first insertion through hole 251 and the second insertion through hole 261 can guide and limit movement of the push rod 351. The first end of the rod body 3511 is exposed outside the magnet yoke 23 and extends into the base 31. The limiting part 3513 is configured to abut against a side of the first abutting part 252 away from the moving iron core 26, to abut against the first abutting part 252 when the push rod 351 moves toward the moving iron core 26 and returns to the original position, thereby preventing the push rod 351 from being deviated from the original position.

The insulated sleeve 352 is fixedly sleeved on the first end of the push rod 351 and is accommodated in the base 31. The contact bracket 353 is fixedly sleeved on the insulated sleeve 352. The moving contact 357 and the contact spring 358 are both flexibly sleeved on the insulated sleeve 352. The contact spring 358 elastically abuts between the moving contact 357 and the contact bracket 353.

The contact bracket 353 is approximately a frame structure. The contact bracket 353 includes a first support kit 354 and a second support kit 355 that are disposed relative to each other. The second support kit 355 is disposed close to the magnet yoke 23. The second support kit 355 is made of an insulating material. It may be understood that the contact bracket 353 may be all made of an insulating material, or may be disposed according to an actual requirement. A first connection hole 3541 is disposed on the first support kit 354. A second connection hole 3551 is disposed on the second support kit 355. The insulated sleeve 352 fixedly passes through the first connection hole 3541 and the second connection hole 3551. In other words, the insulated sleeve 352 extends from the first connection hole 3541 to the second connection hole 3551 along the rod body 3511. The moving contact 357 can move along an outer wall of the insulated sleeve 352, to improve an overrun of the moving contact 357.

In this implementation, the first connection hole 3541 includes a first installation section 3543 and a second installation section 3545. The first installation section 3543 is disposed on an end of the first connection hole 3541 away from the second support kit 355. An aperture of the first installation section 3543 is greater than an aperture of the second installation section 3545. The insulated sleeve 352 includes a guide part 3521 and an abutting flange 3523 disposed on an end of the guide part 3521. The guide part 3521 fixedly passes through the first connection hole 3541 and the second connection hole 3551. The abutting flange 3523 is fixedly accommodated in the first installation section 3543 and abuts against a bottom wall of the first installation section 3543. The second support kit 355 includes a board body and a convex part 3555 disposed on the board body facing the first support kit 354. The second connection hole 3551 passes through the board body and the convex part 3555. The contact spring 358 is sleeved outside the convex part 3555. The contact spring 358 elastically abuts between the moving contact 357 and the board body.

It may be understood that the first connection hole 3541 may be not a through hole passing through the first support kit 354. The first connection hole 3541 is a blind hole disposed on a side of the first support kit 354 facing the second support kit 355. The abutting flange 3523 is located on a side of the first support kit 354 away from the second support kit 355 and abuts against the first support kit 354.

A slot 3515 is disposed on the first end of the push rod 351. The slot 3515 is located on the side of the first support kit 354 away from the second support kit 355. The moving contact component 35 further includes a circlip 356 and a gasket 359. The circlip 356 is clamped into the slot 3515. The gasket 359 is sleeved on the push rod 351. The gasket 359 is located between the circlip 356 and the abutting flange 3523. The circlip 356 is configured to prevent the insulated sleeve 352 from leaving the push rod 351, and prevent the insulated sleeve 352 from moving in the axial direction of the push rod 351. The gasket 359 is configured to prevent looseness between the insulated sleeve 352 and the circlip 356, and prevent damage of the circlip 356 to the insulated sleeve 352, thereby prolonging a service life of the insulated sleeve 352.

When the contact apparatus 30 is assembled, the moving contact 357 and the contact spring 358 are first fitted into the contact bracket 353. The insulated sleeve 352 is inserted into the contact bracket 353 from the first connection hole 3541 of the first support kit 354 toward the second connection hole 3551 of the second support kit 355. The first end of the push rod 351 is inserted into the insulated sleeve 352 in a direction from the second support kit 355 of the contact bracket 353 toward the first support kit 354. The gasket 359 is disposed on the first end of the push rod 351. The circlip 356 is clamped into the slot 3515 of the push rod 351, so that the gasket 359 is located between the circlip 356 and the insulated sleeve 352, thereby completing assembly of the contact apparatus 30.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A contact apparatus of an electromagnetic switch and comprising:
- a fixed contact; and
- a moving contact component comprising:
  - a push rod comprising:
    - a first end; and
    - a second end configured to couple to a drive apparatus;
  - an insulated sleeve fixedly sleeved on the first end;
  - a contact bracket fixedly sleeved on the insulated sleeve;
  - a moving contact flexibly sleeved on the insulated sleeve, wherein the moving contact and the fixed contact are disposed relative to each other in an extension direction of the push rod, and wherein the moving contact is capable of being driven by the push rod to be coupled to the fixed contact; and
  - a contact spring flexibly sleeved on the insulated sleeve and configured to elastically abut between the moving contact and the contact bracket.

2. The contact apparatus of claim 1, wherein the contact bracket comprises:
- a first support kit;
- a second support kit disposed relative to the first support kit;
- a first connection hole disposed on the first support kit; and
- a second connection hole disposed on the second support kit,
- wherein the first end is configured to fixedly pass through the first connection hole and the second connection hole,
- wherein the moving contact is located between the first support kit and the contact spring, and
- wherein the contact spring is located between the moving contact and the second support kit.

3. The contact apparatus of claim 2, wherein the first connection hole is a through hole passing through the first support kit, and wherein the insulated sleeve comprises:
- a guide part comprising a third end and configured to fixedly pass through the first connection hole and the second connection hole; and
- an abutting flange disposed on the third end and configured to abut against a side of the first support kit away from the second support kit.

4. The contact apparatus of claim 3, wherein the first connection hole comprises:
- a fourth end disposed away from the second support kit;
- a first installation section disposed on the fourth end and comprising a first aperture and a bottom wall, wherein the abutting flange is fixedly accommodated in the first installation section and configured to abut against the bottom wall; and
- a second installation section comprising a second aperture, wherein the first aperture is larger than the second aperture.

5. The contact apparatus of claim 3, further comprising:
- a slot disposed on the first end and located on the side of the first support kit away from the second support kit; and
- a circlip clamped into the slot and configured to abut against the abutting flange.

6. The contact apparatus of claim 5, further comprising a gasket located between an abutting part and the circlip.

7. The contact apparatus of claim 2, wherein the second support kit comprises:
- a board body; and
- a convex part disposed on the board body and facing the first support kit, wherein the contact spring is sleeved outside the convex part, and wherein the contact spring is further configured to elastically abut between the moving contact and the board body.

8. The contact apparatus of claim 1, further comprising a base, wherein the fixed contact is fixed to the base, wherein parts of the fixed contact, the contact bracket, the insulated sleeve, and the contact spring are located in the base, wherein the first end is configured to extend into the base, and wherein the second end is exposed outside the base.

9. The contact apparatus of claim 8, wherein the push rod further comprises:
- a rod body comprising:
  - a circumferential direction; and
  - a third end; and
- a convex limiting part disposed in the circumferential direction and configured to expose outside the base to abut against a fixed iron core of the drive apparatus, wherein the insulated sleeve is sleeved on the third end.

10. An electromagnetic switch comprising:
- a drive apparatus; and
- a contact apparatus comprising:
  - a fixed contact; and
  - a moving contact component comprising:
    - a push rod comprising:
      - a first end; and
      - a second end configured to connect to the drive apparatus;
    - an insulated sleeve fixedly sleeved on the first end;
    - a contact bracket fixedly sleeved on the insulated sleeve;
    - a moving contact flexibly sleeved on the insulated sleeve, wherein the moving contact and the fixed contact are disposed relative to each other in an extension direction of the push rod, and wherein the moving contact is capable of being driven by the push rod to be coupled to the fixed contact; and
    - a contact spring flexibly sleeved on the insulated sleeve and configured to elastically abut between the moving contact and the contact bracket.

11. The electromagnetic switch of claim 10, wherein the contact bracket comprises:
- a first support kit;
- a second support kit disposed relative to the first support kit;
- a first connection hole disposed on the first support kit; and
- a second connection hole disposed on the second support kit,
- wherein the first end is configured to fixedly pass through the first connection hole and the second connection hole,
- wherein the moving contact is located between the first support kit and the contact spring, and
- wherein the contact spring is located between the moving contact and the second support kit.

12. The electromagnetic switch of claim 11, wherein the first connection hole is a through hole passing through the first support kit, and wherein the insulated sleeve comprises:

a guide part comprising a third end and configured to fixedly pass through the first connection hole and the second connection hole; and an abutting flange disposed on the third end and configured to abut against a side of the first support kit away from the second support kit.

13. The electromagnetic switch of claim 12, wherein the first connection hole comprises:

a fourth end disposed away from the second support kit;

a first installation section disposed on the fourth end and comprising a first aperture and a bottom wall, wherein the abutting flange is fixedly accommodated in the first installation section and configured to abut against the bottom wall; and a second installation section comprising a second aperture, wherein the first aperture is larger than the second aperture.

14. The electromagnetic switch of claim 12, wherein the contact apparatus further comprises:

a slot disposed on the first end and located on the side of the first support kit away from the second support kit; and a circlip clamped into the slot and configured to abut against the abutting flange.

15. The electromagnetic switch of claim 10, wherein the contact apparatus further comprises a base, wherein the fixed contact is fixed to the base, wherein a part of the fixed contact, the contact bracket, the insulated sleeve, and the contact spring are located in the base, wherein the first end is configured to extend into the base, and wherein the second end is exposed outside the base.

16. The electromagnetic switch of claim 15, wherein the push rod further comprises:

a rod body comprising:

a circumferential direction; and a third end; and a convex limiting part disposed in the circumferential direction and configured to expose outside the base to abut against a fixed iron core of the drive apparatus, wherein the insulated sleeve is sleeved on the third end.

17. The electromagnetic switch of claim 16, wherein the drive apparatus comprises:

a magnet yoke;

a coil skeleton fixedly accommodated in the magnet yoke and comprising an axial direction and a fourth end that is proximate to the contact bracket;

coils sleeved outside the coil skeleton;

a moving iron core accommodated in the coil skeleton along the axial direction and fixedly coupled to the second end, wherein the fixed iron core is accommodated in the coil skeleton along the axial direction and fixed on the fourth end, wherein the push rod is configured to flexibly pass through the fixed iron core and the magnet yoke, and wherein the fixed iron core is capable of being magnetized after the coils are charged to generate suction force to enable the moving iron core to move towards the fixed iron core under a function of the suction force; and a reset spring sleeved on the push rod and configured to abut between the fixed iron core and the moving iron core.

18. The electromagnetic switch of claim 17, further comprising:

a first insertion through hole disposed on the fixed iron core and comprising a first inner wall;

a first convex abutting part disposed on the first inner wall;

a second insertion through hole disposed on the moving iron core and comprising a second inner wall, wherein the first insertion through hole and the second insertion through hole are coaxially disposed; and a second convex abutting part disposed on the second inner wall, wherein the reset spring is configured to abut between the first convex abutting part and the second convex abutting part, and wherein the push rod is configured to pass through the first insertion through hole and the second insertion through hole.

19. The electromagnetic switch of claim 17, wherein the coil skeleton is a hollow structure and comprises a first inner wall, and wherein the magnet yoke comprises:

an enclosure comprising:

a second inner wall;

an opening;

a convex positioning part on the second inner wall, wherein the coil skeleton is sleeved on the convex positioning part; and a fifth end;

a cover configured to fixedly cover the opening;

a mounting hole disposed on the fifth end that is away from the cover, wherein the convex positioning part is disposed around the mounting hole; and an abutting step disposed on the first inner wall, wherein the convex positioning part is configured to abut against the abutting step.

20. The electromagnetic switch of claim 17, wherein the drive apparatus further comprises a sealing sleeve, and wherein the sealing sleeve is accommodated in the coil skeleton and configured to cover the fixed iron core and the moving iron core in a sealing manner.

* * * * *